United States Patent Office 3,657,346
Patented Apr. 18, 1972

---

3,657,346
N,N-DIMETHYL-N'-(2,5-DIMETHYLBENZYL) FORMAMIDINE
Dieter Duerr, Bottmingen, and Heinz Siegle, Binningen, Switzerland, assignors to Ciba Limited, Basel, Switzerland
No Drawing. Filed Jan. 17, 1968, Ser. No. 698,445
Claims priority, application Switzerland, Jan. 26, 1967, 1,187/67
Int. Cl. C07c 23/00
U.S. Cl. 260—564 R                    1 Claim

---

ABSTRACT OF THE DISCLOSURE

The present invention relates to a new amidine of the formula

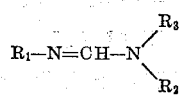

or an acid addition salt thereof, wherein $R_1$ represents an aliphatic, cycloaliphatic, cycloaliphatic-aliphatic or araliphatic radical, $R_2$ represents a hydrogen atom or a lower aliphatic radical and $R_3$ represents a lower aliphatic radical, or wherein $R_2$ and $R_3$ together with the nitrogen atom to which they are bonded represent a 5-membered to 7-membered heterocyclic structure optionally containing further hetero-atoms as well as to pesticidal preparations, which contain, as active ingredient, an amidine as defined above.

---

The present invention provides a pesticidal preparation, especially a preparation for combating plant-pathogenic bacteria and fungi, which comrises, as active component, a compound of formula

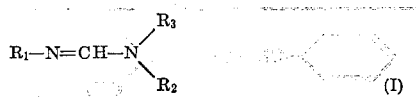 (I)

or an acid addition salt thereof, wherein $R_1$ represents an aliphatic, cycloaliphatic, cycloaliphatic-aliphatic or araliphatic radical, $R_2$ represents a hydrogen atom or a lower aliphatic radical and $R_3$ represents a lower aliphatic radical, or wherein $R_2$ and $R_3$ together with the nitrogen atom to which they are bonded represent a 5-membered to 7-membered heterocyclic structure optionally containing further hetero-atoms, together with a suitable carrier. The preparation may contain one or more of the following additives: a solvent, a dispersing agent, an emulsifier, a wetting agent, an adhesive, a thickener, a fertiliser as well as other known pesticides.

By the term "aliphatic radicals," there are to be understood those radicals which are of saturated or unsaturated nature, i.e. which may contain none, one or more double or triple bonds, or also such radicals that are interrupted by one or more O, S or NH— and/or N-alkyl groups.

Cycloaliphatic radicals may be derived from 3-membered to 8-membered rings.

The active substances preferred are those characterised by the general formula

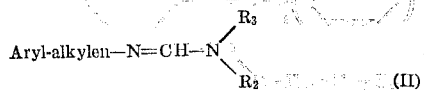 (II)

wherein "Aryl" represents a phenyl radical which is optionally substituted by halogen atoms, alkyl, alkoxy or alkylthio residues, nitrile, nitro and/or $CF_3$ groups, and "alkylene" represents an alkylene radical having 1 to 4 carbon atoms and $R_2$ and $R_3$ have the significance mentioned initially.

The active substances of Formula I and II, in addition to exhibiting a bactericidal and fungicidal effect, show a herbicidal effect when used in higher amounts, and possess a lethal effect on insects, representatives of the order Akarina, soil nematodes, ectoparasites and endoparasites, snails and water pests, for example, algae and tubular worms.

The preparations which contain the active substances of Formulae I and/or II may be applied in many different ways, for example, in the form of aqueous sprays and dusting powders.

Aqueous sprays may, for example, be manufactured on the basis of an emulsifiable concentrate or a wettable powder. A suitable emulsifiable concentrate may, for example, be manufactured from 1 to 50 parts of a compound of Formula I, 40–50 parts of diacetonealcohol or isophorone, 20–30 parts of an aromatic petroleum product, xylene, toluene or some other mixture of such solvents, and 2–10 parts of one or more emulsifiers. It is also possible to use small quantities of a compound which assists the formation of a homogeneous solution, for example, methanol, methoxymethanol or butoxymethanol.

A suitable emulsifier may for example be manufactured from 1–1.5 parts of potassium or sodium dodecylbenzenesulphonate, 2.5–4 parts of an octylphenoxypolyethoxyethanol or nonylphenoxypolyethoxyethanol, as well as approximately 0.5–1 part of methanol and 0–0.8 part of xylene. The resulting mixture is added to the solvents and the active substance of Formulae I in the abovementioned ratio. It is however also possible to use one or more other surface-active agents.

If desired and appropriate, any such material soluble in solvents may be used as an anionic or cationic or nonionic emulsifier. Instead of the abovementioned nonionic agent derived from an alkylphenol and ethylene oxide, it is, for example, possible to use ethylene oxide condensates of long-chain alcohols, carboxylic acids, phenols or amines. Compounds of all these types are commercially available. Condensates of glycerine diricinoleate and ethylene oxide may also be used in the manufacture of self-emulsifiable preparations. Examples of anionic agents that may be used are those based on alcohol sulphonates, alcohol sulphates or alcohol sulphosuccinates. As cationic surface-active agents which are soluble in solvents, there may be mentioned oleyl-benzyl-dimethyl-ammonium chloride or dodecyl-benzyl-trimethyl-ammonium chloride or bromide. It may be seen from this that the nature of the emulsifier is not important, provided that it is soluble in the solution of the active substance in one or more inert organic solvents.

A wettable powder may be obtained if an active substance of Formula I or II is taken up in a volatile solvent, for example, acetone, and mixed with a finely powdered solid, for example, kaolin, pyrophyllite or diatomaceous earth whilst evaporating the solvent. The powder is heated with small quantities of one or more wetting agents and dispersing agents. An example of a typical composition consists of 20 parts of an active substance of Formula I or II, 77.5 parts of one or more finely powdered solids, 0.5 part of a wetting agent, for example, an octylphenoxypolyethoxyethanol and 2 parts of the sodium salt of a condensed naphthalene-formaldehyde-sulphonate.

Dusts containing 5–10% of the active material can be manufactured by diluting such a wettable powder with a finely powdered solid carrier. If desired, the wetting agent may be omitted. The dispersing agent may also be omitted if desired, or may be replaced by others.

Generally, each of the fungicidal preparations described above contains a carrier and in most cases also a surface-active agent.

The materials according to the invention may be applied by themselves or mixed with other fungicidally active substances.

As such, there may be mentioned for example: thiocarbamates, for example, Maneb, Zineb, Ferbam and Ziram, and also thiurams for example, TMTD, DPTD, Metiram, chloronitrobenzenes, Captan, Dithianone, Dodine, Dinocap and Wepsyn®.

The active substances of Formulae I and II have hitherto not been described in the literature. The present invention therefore also provides amidines of formula $$R_1-N=CH-N\begin{matrix}R_3\\R_2\end{matrix}$$

or acid addition salts thereof wherein $R_1$ represents an aliphatic, cycloaliphatic, cycloaliphatic-aliphatic or araliphatic radical, $R_2$ represents a hydrogen atom or a lower aliphatic radical and $R_3$ represents a lower aliphatic radical, or wherein $R_2$ and $R_3$ together with the nitrogen atom to which they are bonded represent a 5-membered a 7-membered heterocyclic structure which optionally contains further hetero-atoms.

The present invention also provides a process for the manufacture of the new amidines of Formula I which comprises reacting
(a) either a compound of formula $$R_1-N=CH-X \quad (III)$$

wherein X represents the residue of a strong acid or a lower alkoxy residue with an amine of formula $$HN\begin{matrix}R_3\\R_2\end{matrix}$$

or reacting
(b) the condensation product of a formamide of formula $$OCH-N\begin{matrix}R_3\\R_2\end{matrix} \quad (IV)$$

and a halogenating reagent with an amine $$R_1-NH_2$$

In the former case, it is thus possible to use imidhalides or imido-O-sulphonic acid esters, for example, the tosyl or mesyl ester, or O-alkyl-isoformyl-N-alkylamines or O-alkyl-isoformyl-N-cycloalkylamines as starting sobstances.

In case (b) it is, for example, possible to allow the condensation product of a formamide IV with a halogenating agent, i.e. for example thionyl chloride, phosgene, $POCl_3$, phosphorus pentachloride and the like, to react with an amine of formula $R_1-NH_2$.

EXAMPLE 1

N,N-dimethyl-N'-2,5-dimethylbenzyl-formamidine 44.2 g. of dry dimethylformamide are stirred with 72 g. of thionyl chloride for 2 hours at 40° and a solution of 68 g. of 2,5-dimethylbenzylamine in 200 ml. of dry xylene is then added dropwise. The resulting crystal sludge is slowly heated and heated for 6 hours under reflux. The mixture is allowed to cool and 10 N sodium hydroxide solution is added until there is a strong alkaline reaction. The organic layer is separated off, washed with water, dried and fractionated in vacuo. 64 g. of the product distill off. Boiling point 84°/0.1 mm. Hg [Compound No. 1].

The following were manufactured in the same manner:

| Compound No. | | Boiling point |
|---|---|---|
| 2 |  Ph-CH$_2$-N=CH-N(CH$_3$)$_2$ | B.P. 78°/0.2 mm. |
| 3 | Cl-Ph-CH$_2$-N=CH-N(CH$_3$)$_2$ | B.P. 106°/0.8 mm. |
| 4 | Ph-CH$_2$-CH$_2$-N=CH-N(CH$_3$)$_2$ | B.P. 80°/0.15 mm. |
| 5 | Ph-CH(CH$_3$)-N=CH-N(CH$_3$)$_2$ | B.P. 79°/0.65 mm. |
| 6 | C$_6$H$_{11}$-N=CH-N(CH$_3$)$_2$ | B.P. 92°/12 mm. |
| 7 | (CH$_3$)$_3$C-CH$_2$-C(CH$_3$)$_2$-N=CH-N(CH$_3$)$_2$ | B.P. 78-80° 12/mm. |
| 8 | (Ph)$_2$C=N-CN-N(morpholino) | M.P. 194-195° |
| 9 | C$_{12}$H$_{25}$-N=CH-N(CH$_3$)$_2$ | |
| 10 | C$_{11}$H$_{23}$-N=CH-N(CH$_3$)$_2$ | |

TABLE—Continued

| Compound No. | | Boiling point |
|---|---|---|
| 11 | CH₃OC₃H₆—N=CH—N(CH₃)₂ | |
| 12 | H₃C—C(CH₃)₂—CH₂—C(CH₃)₂—CH₂—N=CH—N(CH₃)₂ | |
| 13 | CH₂=CH—CH₂—N=CH—N(CH₃)₂ | |
| 14 | CH₂=CCl—CH₂—N=CH—N(CH₃)₂ | |
| 15 | F₃C—C₆H₄—CH₂—N=CH—N(CH₃)₂ | |
| 16 | (furyl)—CH₂—N=CH—N(CH₃)₂ | |
| 17 | 2,4-Cl₂C₆H₃—CH₂—N=CH—N(CH₃)₂ | B.P. 114°/0.4 mm. |

EXAMPLE 2

The compound of the formula

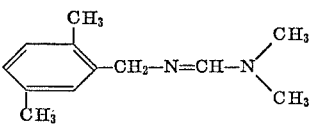

can also be manufactured by reacting 2,5-dimethyl-O-ethylisoformyl-benzylamide.

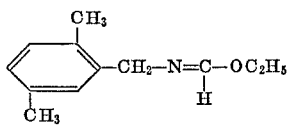

with dimethylamine.

The amidines so obtained can, if necessary, also be isolated in the form of their acid addition salts with inorganic and organic acids and incorporated into the preparations according to the invention.

Suitable acids for salt formation are for example, sulphuric acid, hydrobromic acid or hydrochloric acid, sulphamic acid, acetic acid, taurine, ethionic acid, benzoic acid and phthalic acid.

EXAMPLE 3

40 g. of the compound No. 3 are taken up in a 25% strength xylene solution of a mixture consisting of equal parts of a condensation product of about 1 mol of p-tert. octylphenol with about 10 mols of ethylene oxide and calcium p-dodecylbenzenesulphonate, and the batch is made up to 100 ccs. with xylene.

An emulsion concentrate is thus obtained, which can be diluted with water as desired to give stable emulsions.

EXAMPLE 4

The effect of compound No. 3 against leaf spot fungi was confirmed on celery (Apium graveolens L.) using the fungus Septoria apii Chest. Celery plants were grown in a greenhouse and were sprayed once, two days before infection, with a browth containing 0.1% of active substance of the product under investigation. After infection with an aqueous suspension of spores of Septoria apii, the plants were incubated in a humid chamber at room temperature, and were thereafter assessed for attack in comparison with an untreated control (0% effect). The effect of compound No. 3 was 100%, and there was no phytotoxicity.

We claim:
1. N,N - dimethyl - N' - (2,5 - dimethylbenzyl) - formamidine.

References Cited

UNITED STATES PATENTS

| 3,189,648 | 6/1965 | Gerjovich | 260—564 |
| 3,394,397 | 7/1968 | Duerr et al. | 260—564 |

OTHER REFERENCES

Berichte, vol. 92, p. 846 (1959).

NICHOLAS S. RIZZO, Primary Examiner

A. M. T. TIGHE, Assistant Examiner

U.S. Cl. X.R.

260—240 G, 247.5 R; 424—326